(12) United States Patent
Dittenberger et al.

(10) Patent No.: US 10,155,262 B2
(45) Date of Patent: Dec. 18, 2018

(54) MONITORING OF A LINE SYSTEM

(71) Applicant: Primetals Technologies Austria GmbH, Linz (AT)

(72) Inventors: Kurt Dittenberger, Leonding (AT); Klemens Hauser, Pucking (AT); Daniel Lanzerstorfer, Herzogsdorf (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 128 days.

(21) Appl. No.: 15/116,479

(22) PCT Filed: Dec. 9, 2014

(86) PCT No.: PCT/EP2014/076957
§ 371 (c)(1),
(2) Date: Aug. 3, 2016

(87) PCT Pub. No.: WO2015/117697
PCT Pub. Date: Aug. 13, 2015

(65) Prior Publication Data
US 2017/0113267 A1 Apr. 27, 2017

(30) Foreign Application Priority Data

Feb. 7, 2014 (EP) .................................. 14154234

(51) Int. Cl.
*G01F 1/00* (2006.01)
*B22D 11/124* (2006.01)
(Continued)

(52) U.S. Cl.
CPC ...... *B22D 11/1246* (2013.01); *B22D 11/1245* (2013.01); *B22D 11/22* (2013.01);
(Continued)

(58) Field of Classification Search
CPC ..... G05D 7/0635; G01F 1/42; Y10T 137/776; Y10T 137/8326; Y10T 137/2705; Y10T 137/7761
(Continued)

(56) References Cited

U.S. PATENT DOCUMENTS 6,302,130 B1 10/2001 Ohmi et al.
7,523,867 B2 4/2009 Brown ............................ 73/592
(Continued)

FOREIGN PATENT DOCUMENTS

AT     513 042 B1   1/2014
CN   1275218 A   11/2000
(Continued)

OTHER PUBLICATIONS

International Search Report dated Apr. 8, 2015 issued in corresponding International Patent Application No. PCT/EP2014/076957.
(Continued)

*Primary Examiner* — An Do
(74) *Attorney, Agent, or Firm* — Ostrolenk Faber LLP

(57) ABSTRACT

Monitoring of a line system (1) in which a liquid medium (3) is guided in a line (2). The current pressure of the liquid medium (3) in the line (2) and in the associated current flow are sensed at sensing times. The two values are fed to a computing unit (5). The computing unit (5) calculates a theoretical flow of the liquid medium (3) in the line (2) from the sensed current pressure by taking into account a specified flow function. The flow function describes a physical relationship between the theoretical flow of the liquid medium (3) and the current pressure of the liquid medium (3). The computing unit (5) determines an individual degree of clogging on the basis of the current flow and the theoretical flow. On the basis of a number of determined individual degrees of clogging and by using stochastic methods, the computing unit (5) calculates an interval within which a degree of clogging of the line system (1) lies with a probability to be defined. The line system (1) is monitored by using the size of the interval and/or the position of the
(Continued)

interval with respect to first limits for the degree of clogging that are defined beforehand.

14 Claims, 2 Drawing Sheets

(51) Int. Cl.
    *B22D 11/22*     (2006.01)
    *B22D 46/00*     (2006.01)
    *G01F 9/00*     (2006.01)
    *C21D 11/00*     (2006.01)

(52) U.S. Cl.
    CPC ............ *B22D 11/225* (2013.01); *B22D 46/00* (2013.01); *G01F 9/00* (2013.01); *C21D 11/005* (2013.01)

(58) Field of Classification Search
    USPC .............................. 702/33, 45, 47; 73/861.52
    See application file for complete search history.

(56) References Cited

U.S. PATENT DOCUMENTS 7,591,173 B2     9/2009    Benscoter et al.
7,945,414 B2 *   5/2011    Nagase .................... G01F 1/42
                                                             340/611
8,307,845 B2 *   11/2012   Kouchi .................. G01F 1/363
                                                              137/486
9,540,713 B2     1/2017    Shimizu et al.

FOREIGN PATENT DOCUMENTS

| CN | 101260851 A | 9/2008 |
|---|---|---|
| CN | 101809183 A | 8/2010 |
| CN | 202606310 U | 12/2012 |
| CN | 103157321 A | 6/2013 |
| DE | 44 17 808 A1 | 12/1994 |
| DE | 10064783 A1 | 5/2002 |
| DE | 10 2009 051931 A1 | 5/2011 |
| JP | H 01-149909 | 6/1989 |
| RU | 2366898 C2 | 9/2009 |
| SU | 1729688 A1 | 4/1992 |

OTHER PUBLICATIONS

International Preliminary Report on Patentability dated May 3, 2016 issued in corresponding International Patent Application No. PCT/EP2014/076957.

Russian Federation Office Action, dated Aug. 14, 2018, issued in corresponding Russian Federation Patent Application No. 2016132304/02(050083). Total 9 pages.

* cited by examiner

MONITORING OF A LINE SYSTEM

CROSS-REFERENCE TO RELATED APPLICATIONS

The present application is a 35 U.S.C. §§ 371 national phase conversion of PCT/EP2014/076957, filed Dec. 9, 2014, which claims priority of European Patent Application No. 14154234.0, filed Feb. 7, 2014, the contents of which are incorporated by reference herein. The PCT International Application was published in the German language.

The invention relates to a method and a device for monitoring a line system guiding a liquid medium. The line system has at least one line with which the determination of the pressure of the liquid medium and the flow of the liquid medium in the at least one line are used to calculate a degree of clogging for the at least one line. This is used as an indication of the presence of a fault in the line system.

TECHNICAL BACKGROUND

High requirements for reliability are placed on line systems, which guide liquid media, since these are often central components of safety-related devices. In such cases, the operational reliability of line systems as a component of cooling apparatuses has to be constantly checked since a failure of the line system, due for example to leaks or clogging, can cause high levels of damage.

If, for example, the line system guides liquid media such as water, one known method for monitoring a line system of this kind consists in continuous sensing of the current flow of the liquid medium in the line system as a parameter. A so-called water-pressure function is used to determine a so-called theoretical pressure of the liquid medium from the sensed parameters. The theoretical pressure of the liquid medium is the pressure obtained by inserting the current flow of the liquid medium from the water-pressure function. After measuring the current pressure of the liquid medium in the line system, the difference between the current pressure of the liquid medium and the theoretical pressure of the liquid medium is determined. The resulting differences are, for example, used as a measure for the clogging or as a measure for the size of the leak in the line system and is constantly compared against a prespecified tolerance. If the tolerance is exceeded for a lengthy period, an alarm is issued as an indication of a fault in the line system.

Here it is a drawback that the sensed parameters are generally exposed to a high level of noise which triggers unnecessary false alarms. In order to avoid this, relatively high tolerances are specified, wherein this in turn has a negative impact on reliability. A further drawback consists in the fact that the difference determined between the current pressure of the liquid medium and the theoretical pressure of the liquid medium only identifies a tendency for the measure for the clogging. Therefore, it is generally difficult to specify sensible values for the tolerances with which both few false alarms are issued and a certain degree of reliability of the monitoring is provided.

Known from DE 10 2009 051 931 A1 is a method for early leak detection in a cooling device for cooling an engineering plant. With this method, two controllable values are arranged in a line at a certain distance one behind the other. Two pressure sensors are arranged between the two valves. Each of the two pressure sensors is arranged in the vicinity of one of the two valves. The actual pressures are sensed and compared with expected pressures. The comparison is used to draw conclusions regarding the presence of a leak.

It is known from AT 513 042 B1 to repeatedly sense a pressure difference and an actual flow in a line system and to determine therefrom the hydraulic resistance of the line system. The hydraulic resistance determined is output in a visual form. It is also possible to check automatically whether the hydraulic resistance determined lies within a permitted range. If the hydraulic resistance is out of the range, a warning signal may be output.

It is known from JP H01 149 109 A to shut off a section of a line system on the output side by means of a valve, then to expose it to pressure and finally to shut it off on the input side as well by means of a further valve. The pressure in the section of the line system is then sensed and evaluated.

It is known from AT 513 042 B1 to determine a drop in pressure and a flow rate at a particular time and to calculate the hydraulic resistance therefrom. On the basis of this variable it is then decided whether residues or leakages are present. The hydraulic resistance can be displayed on a monitor. A permitted range for the hydraulic resistance can be defined. A warning message is output when the hydraulic resistance is out of the permitted range. In AT 513 042 B1 a formula for calculating the hydraulic resistance is specified, which can be considered the flow function.

SUMMARY OF THE INVENTION

The object of the present invention is to provide possibilities for reliable monitoring of a line system that overcome the drawbacks described.

According to the method according to the invention,
a) in each case the current pressure of the liquid medium in the at least one line and in each case the associated current flow in the at least one line are sensed at sensing times,
b) in each case the sensed current pressure and in each case the sensed current flow are received by a computing unit,
c) the computing unit calculates a respective theoretical flow of the liquid medium in the at least one line from the respective sensed current pressure taking into account a prespecified flow function describing a physical relationship between the theoretical flow of the liquid medium and the respective current pressure of the liquid medium,
d) the computing unit determines a respective individual degree of clogging on the basis of the respective current and the respective theoretical flow,
e) the computing unit calculates an interval within which a degree of clogging of the line system lies with a probability to be defined on the basis of a number of determined individual degrees of clogging using stochastic methods and
f) the line system is monitored by using the size of the calculated interval and/or the position of the calculated interval with respect to first limits for the degree of clogging that are defined beforehand as an indication of the presence of a fault in the line system.

The at least one line of the line system contains the liquid medium. In each case the current or the actual pressure of the liquid medium and in each case the associated current or the actual flow of the liquid medium in the at least one line of the line system is sensed at sensing times. The variables determined are sent to a computing unit and received by the computing unit. In the computing unit, the respective sensed current pressure is used as the basis for the calculation of a theoretical flow of the liquid medium in the at least one line, taking into account a so-called flow function describing a physical relationship between the theoretical flow of the liquid medium and the current pressure of the liquid medium.

A condition, that the line system is trouble-free is—i.e. there are no leaks and/or clogging, the theoretical flow function is, for example, determined as follows:

For each current pressure of the liquid medium, the current flow of the liquid medium in the line system or in the at least one line is determined. The value tuples generated thereby empirically describe the relationship between the current pressure of the liquid medium and the current flow of the liquid medium in the line system. The relationship generated is fitted by means of a suitable function—the flow function. The flow function is stored in a computing unit comprising a computer program product.

The theoretical principles and the derivation of the flow function are as follows:

According to Pascal's law, the pressure difference $\Delta pw$ of the liquid medium in the line system or in the at least one line is as follows:

$$\Delta pw = \rho g \Delta h$$

where $\rho$ is the density of the liquid medium, g is the gravitational acceleration and $\Delta h$ is the height difference between a pressure gauge for measuring the pressure of the liquid medium and the position of the line system or the at least one line.

The pressure loss due to friction $\Delta pf$ in the line system or in the at least one line is expressed by the Darcy-Weisbach equation $$\Delta pf = \frac{\rho v^2}{2} \frac{l}{d} \lambda$$

where $\rho$ is the density of the liquid medium, v is the characteristic speed of the liquid medium, l and d are the length and diameter respectively of the at least one line and $\lambda$ is the Darcy friction factor. Any pressure loss possibly resulting from fittings present in the line is ignored.

The Darcy friction factor $\Delta$ is dependent on the characteristic speed and the roughness of the at least one line. For laminar flows (Reynolds number Re<2050), the following applies:

$$\lambda = \frac{64}{Re} \text{ with } Re = \frac{\rho v d}{\eta}$$

where $\eta$ is the dynamic viscosity of the liquid medium.

The Colebrook-equation from which the Darcy friction factor is numerically determined is applicable for turbulent flows (Reynolds number Re>4000):

$$\frac{1}{\sqrt{\lambda}} = 2\log_{10}\left(\frac{2.51}{Re\sqrt{\lambda}} + \frac{k}{3.7d}\right)$$

where k is the roughness of the at least one line. In practice, the roughness of the at least one line is approximately 0.05 mm.

The Blasius formula is applicable for Re>2010 and Re<4000:

$$\lambda = 0.3164/Re^{0.25}$$

To obtain the flow function, a function is fitted to the value tuples generated. The flow function can, for example, be written as $$w_p = c_1 f^{c_2} + c$$

where $w_p$ is the pressure of the liquid medium, f is the flow of the liquid medium and c, $c_1$ and $c_2$ are coefficients.

In a first step, for example in a test arrangement reflecting the physical relationships of the actual line system or the at least one line, the values determined for the current flow and the current pressure of the liquid medium in the line system are fitted by means of the function $$w_p = c_1 f^{c_2}$$

The coefficients $c_1$ and $c_2 \approx 2$ are constants. In a further step, the data determined in the actual line system for the current flow and the current pressure of the liquid medium are fitted by means of the function $$w_p = p_1 + (p_2 + c_1) f^{c_2} + p_3 f^{1.7}$$

wherein $p_1$ is the pressure difference in respect of the position at which the liquid medium leaves the at least one line and the pressure measurement and $p_2$ and $p_3$ describe the pressure loss of the liquid medium in the line system or in the at least one line due to the friction between the liquid medium and the line system or the at least one line.

Furthermore, according to the Bernoulli's equation, the relationship between the pressure $w_p$ of the liquid medium and the flow f of the liquid medium is expressed as $$w_p = c_1 f^2 + c$$

However, it should be noted that the above-mentioned relationships are only applicable for single-phase flows.

Following the generation of the flow function, the theoretical flow f of the liquid medium in the line system or in the at least one line can be calculated from the determined current pressure $w_p$ of the liquid medium.

The computing unit then calculates an interval for a degree of clogging $\kappa$ within which the degree of clogging $\kappa$ lies with a probability to be defined.

The computing unit then determines a respective individual degree of clogging verstopf from the quotient between the current (measured) flow $f_{act}$ and the theoretical flow f (the flow f is designated a theoretical flow f when it is calculated by inserting the current pressure $w_p$ of the liquid medium into the flow function):

$$verstopf = \frac{f_{act}}{f} - 1$$

In cases when the liquid medium guided in the line system by the at least one line leaves the line system or the at least one line at the end of the at least one line via nozzles, an individual degree of clogging verstopf of −0.1 (=−10%) means, for example, that the line system or at least one line or the nozzle is 10% clogged. An individual degree of clogging verstopf of +0.1 (=+10%) means that 10% of the liquid medium guided in the line system leaves the line system due to a leak.

The calculation of an interval within which a degree of clogging $\kappa$ lies with a certain probability to be defined beforehand is performed by the computing unit on the basis of a number of individual degrees of clogging verstopf determined using stochastic methods. In this context, the theoretical flow f (by means of the flow function) and the current flow $f_{act}$ are determined and/or measured constantly and at cyclic intervals in the line system or in the at least one line as a data flow. Both the theoretical flow f and the current flow $f_{act}$ are treated as random variables. The stochastic methods are used to determine with a specific probability of error the values κ (κ models the degree of clogging) for which the data flows κ·f and $f_{act}$ cannot be generated by the same random process. The probability of the line system or the at least one line having a degree of clogging κ lying within the calculated interval is 1 minus the probability of error.

The line system or the at least one line are monitored by using the position of this interval with respect to permitted first limits for the degree of clogging that are defined beforehand with respect to the presence of a fault in the line system or the at least one line. Alternatively or additionally, it is possible for the size of this interval to be monitored.

A substantial advantage of the method according to the invention consists in the fact that not even noisy signals represent a problem and hence false alarms are avoided during the monitoring of the line system or the at least one line. For the avoidance of false alarms of this kind, the methods known from the prior art specify relatively high tolerances, wherein the tolerances are given as the difference between the current pressure of the liquid medium and the theoretical pressure of the liquid medium. With the method according to the invention, on the other hand, high tolerances are superfluous.

In addition, the difference between the current pressure of the liquid medium and the theoretical pressure of the liquid medium only identifies a tendency for the measure for the clogging. Contrary thereto, the method according to the invention calculates a specific interval within which the degree of clogging lies with a prespecified probability.

In a preferred embodiment of the method according to the invention, the line system is embodied as a cooling system in a metallurgical unit, in particular as a cooling system in a continuous casting plant for the production of a metallic strand, or as a cooling system of a rolling mill for the production of a metal strip, wherein the liquid medium guided by means of the at least one line to a nozzle is applied by means of the nozzle to the metallic strand or to the metal strip.

The liquid medium is guided to the nozzle. The metallic strand produced in the continuous casting plant or the metal strip produced in the rolling mill is cooled by means of the liquid medium that leaves the nozzle. Cooling systems of this kind require a high degree of availability and a high degree of operational dependability and reliability since a failure of the cooling system could give rise to considerable damage. If the method according to the invention is used to monitor the cooling system, faults due to a leak or clogging of the cooling system or the nozzles can be identified quickly and reliably without any unnecessary false alarms being triggered. In this case, the line system is also monitored during a standstill of the continuous casting plant or the rolling mill. This has the advantage that the line system can be checked for faults during servicing work on the continuous casting plant or on the rolling mill and, if applicable, leaks or clogging of the line system can be rectified before the servicing of the continuous casting plant or the rolling mill.

In a further preferred embodiment of the method according to the invention, the liquid medium guided to the at least one nozzle is water. Water is an environmentally neutral medium which is available in a sufficient amount and cheaply and can, for example, be used effectively for cooling.

Preferably, the time intervals between the sensing times are between 2 seconds and 5 seconds. The time interval can, for example, be 3 seconds. Time intervals of this kind represent an optimum ratio between the data volume obtained for the determined parameters and the accuracy or reliability of the method according to the invention.

Therefore, the current pressure and the current flow are repeatedly measured and these measurements are used by the computing unit to determine the respective individual degree of clogging. This individual degree of clogging expands the number of previously determined individual degrees of clogging. In addition, as a rule from a specific number of individual degrees of clogging, the oldest individual degree of clogging is no longer used for the calculation of the interval. The specific number can—for example—be between 20 and 50, in particular between 30 and 40. It is possible for the number to be specified to an automated system carrying out the determination method by an operator of the system.

In a further embodiment of the method according to the invention, the stochastic method includes a one-sample t-test.

A t-test is a statistical hypothesis test, which can be applied to a data sample (=a number of samples) under the assumption of a normal distribution. For the purposes of this application, it is preferable to use the one-sample t-test. Each individual sample corresponds to the respective value pair of current pressure $w_p$, or the theoretical flow f determined therefrom, and current flow $f_{act}$.

Under the assumption that the current (measured) flow $f_{act}$ fluctuates about the theoretical flow f by the value κ, the one-sample t-test can be written in modified form as $$\frac{|E(f_{act}) - \kappa E(f)|}{\sqrt{\mathrm{var}(f_{act}) + \kappa^2 \mathrm{var}(f) - 2\kappa \mathrm{cov}(f_{act}, f)}} \sqrt{n} \le t(1 - a/2, n-1)$$

Here, $E(f_{act})$ is the expected value of the current (measured) flows, E(f) is the expected value of the theoretical flows, var is the variance, cov is the covariance, t is the t-distribution for an a quantile (for example 0.05) and n degrees of freedom and n is the number of values (sample size). Expected value, variance, covariance, t-distribution and quantile are terms with fixed meanings in the field of probability calculations.

In the above equation, only the degree of clogging κ is unknown. All other variables are either in principle constant or determined by the previous stochastic evaluation. In particular, the expected values $E(f_{act})$ and E(f), the variances $\mathrm{var}(f_{act})$ and var(f) and the covariance $\mathrm{cov}(f_{act}, f)$ are determined by the measured current flows $f_{act}$ or determined flows f. The number n of samples used is also known. The probability can be prespecified. Together with the number n of samples used, this determines the value t.

It is therefore possible to transform the above equation into a quadratic equation. This equation is as follows:

$$[nE^2(f) - t^2 \mathrm{var}(f)] \cdot \kappa^2 + [2t\,\mathrm{cov}(f_{act}, f) - 2nE(f_{act})E(f)] \cdot \kappa + [(nE^2(f_{act}) - t^2 \mathrm{var}(f_{act})] \le 0$$

The arguments of the value t have been omitted in the above equation in order not to overburden the above equation unnecessarily.

The solutions κ1 and κ2 to the above equation can therefore be easily determined, wherein (without restricting the generality) k1 is the smaller and k2 the larger solution. verstopf1 and verstopf2 are calculated from k1 and k2 by means of the relationship verstopf=k−1. This means that the degree of clogging lies within the interval [verstopf1;verstopf2] with a probability of (1−α).

The probability to be defined can be specified to the computing unit by an operator. The probability to be defined is therefore freely selectable. As a rule, the probability is set at 90%, preferably at 95%. In the case of critical systems, the probability is set at 99%.

In a preferred embodiment of the method according to the invention, an alarm is issued as an indication of the fault in the line system when the calculated interval for the degree of clogging lies outside the defined limits for the degree of clogging. If verstopf1 and verstopf2 are negative and smaller than the defined first limits, an alarm is issued as an indication of clogging of the at least one line. If verstopf1 and verstopf2 are positive and greater than the defined first limits, an alarm is issued as an indication of a fracture of the at least one line.

If the difference verstopf2 minus verstopf1 is greater than a defined second limit, an alarm is issued indicating that the line system is indeterminable.

For all other values of verstopf1 and verstopf2, the line system is classified as free from defects. Any possible alarms that have already been identified are deleted.

In another embodiment of the method according to the invention, the metallic strand is a steel strand. Apart from steel, 'metallic' should particularly also be understood to mean iron, copper, aluminum or a mixture thereof. It is, for example, also possible for the strand to be an aluminum strand.

In a further embodiment of the method according to the invention, the metallic band is a steel ribbon product. For example, the steel ribbon product is produced by means of a hot rolling process in a hot rolling line of the rolling mill.

It is also conceivable, in addition to the liquid medium, also for a gaseous medium to be guided in a further line of the line system. In this case, the liquid medium and the gaseous medium are, at least partially, guided in separate lines and mixed in the region of the nozzle to form a mixture. The mixture is, for example, then applied to the metallic strand or the metal strip.

In this case, in addition to the liquid medium, the gaseous medium is accordingly taken into account when deriving the flow function.

The object is also achieved by a computer program stored in a non-transitory computer readable storage medium in a computing unit, wherein the computer program comprises a machine code that can be executed by the computing unit. The execution of the machine code by the computing unit causes the computing unit to carry out a method with steps b) to e) of the method according to the invention. As a result of the execution of the machine code, the computing unit preferably also implements advantageous embodiments of the method according to the invention.

The object is also achieved by the computer-readable storage medium on which the computer program according to the invention is stored.

The object is also achieved by a computing unit, wherein the computing unit is programmed with a computer program according to the invention.

The object is also achieved by a device for carrying out the method according to the invention, a) wherein the device comprises a line system having at least one line, wherein a liquid medium can be guided in the at least one line, b) wherein the device in each case comprises at least one apparatus for determining the current pressure of the liquid medium in the at least one line and the current flow of the liquid medium in the at least one line, c) wherein the device comprises a computing unit according to the invention coupled to the apparatuses.

Preferably, the device also comprises a monitoring unit for monitoring the line system by using the size of the calculated interval and/or the position of the calculated interval with respect to first limits for the degree of clogging that are defined beforehand as an indication of the presence of a fault in the line system. The monitoring apparatus can be a component of the computing unit.

One particularly preferred embodiment of the device according to the invention further comprises a metallurgical unit, in particular a continuous casting plant for the production of a metallic strand or a rolling mill for the production of a metal strip equipped with the line system as a cooling system, and at least one nozzle into which the at least one line of the line system opens and by means of which the liquid medium can be applied to the metallic strand or the metal strip.

In a preferred embodiment of the device according to the invention, the device comprises an alarm apparatus for issuing an alarm as an indication of the fault in the line system coupled to the computing unit.

The alarm apparatus is coupled to the computing unit. If a fault is identified in the line system, the alarm apparatus sends a message to a receiving apparatus, in particular to an acoustic and/or a visual optical signaling apparatus. The receiving apparatus can, for example, also be embodied as a mobile telephone, a tablet PC or a computer.

The above described properties, features and advantages of this invention and the manner in which these are achieved will become clearer and more plainly comprehensible in conjunction with the following description of the exemplary embodiments explained in more detail in conjunction with the drawings. The drawings show schematically:

DESCRIPTION OF AN EMBODIMENT

Figure 1:
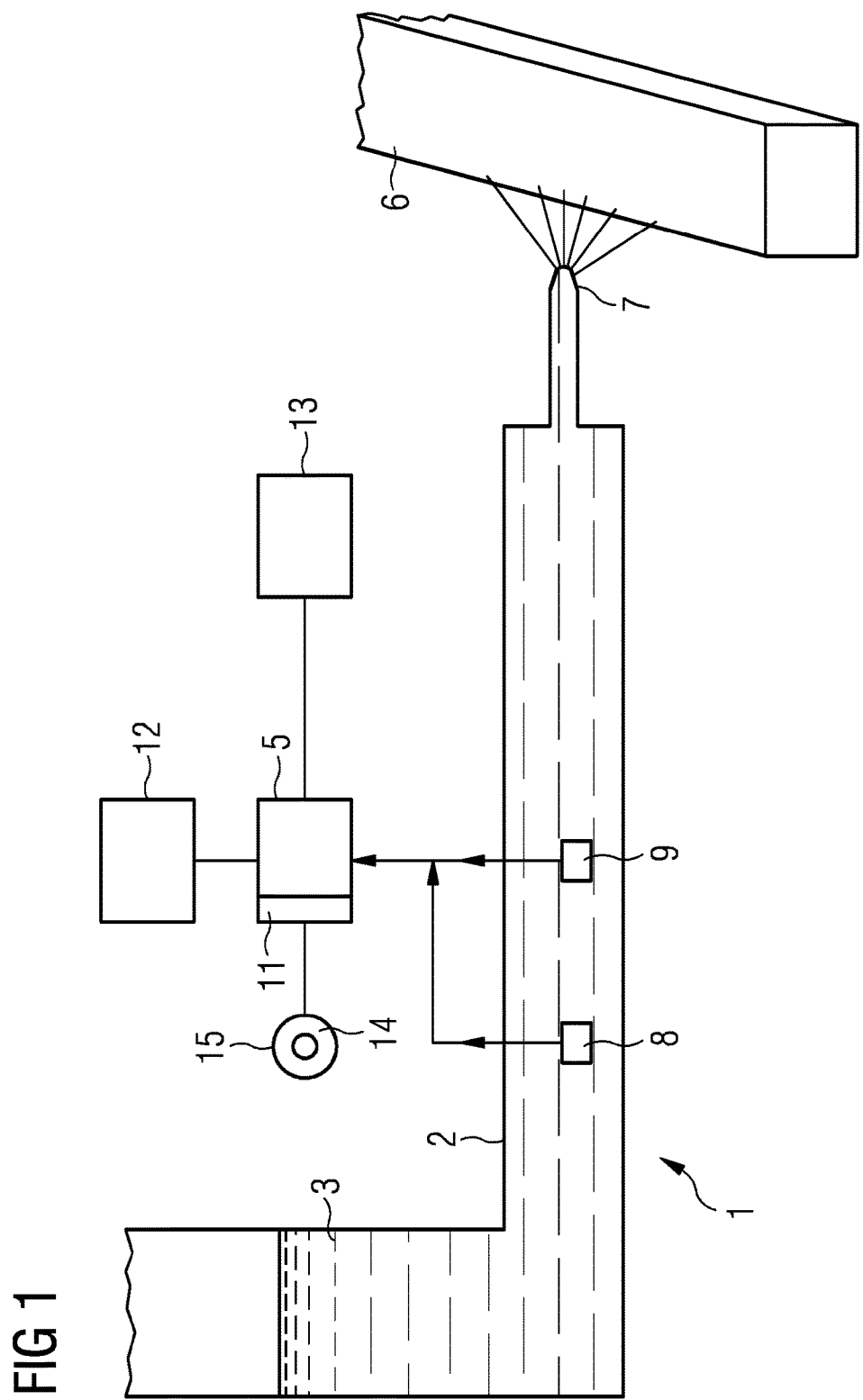
FIG. 1 illustrates a method according to the invention and a device according to the invention for monitoring a line system and FIG. 2 a relationship between the current flow and the current pressure of a liquid medium of a line system and a data fit.

In FIG. 1, a liquid medium 3 is guided in a line 2 of the line system 1, wherein the liquid medium is water.

In a first step, an apparatus 8 for determining a current pressure of the liquid medium 3 in the line 2 and an apparatus 9 for determining the current flow of the liquid medium 3 in the line 2 determine the current pressure of the liquid medium 3 and the current flow of the liquid medium 3 in the line 2 as parameters.

In a second step, the sensed values are sent to a computing unit 5 connected to the apparatuses 8, 9. This receives the sensed values. In a third step, the computing unit 5 calculates a theoretical flow of the liquid medium 3 in the at least one line 2 on the basis of the sensed pressure taking into account a prespecified flow function. The flow function describes a physical relationship between the theoretical flow of the liquid medium 3 and the current pressure of the liquid medium 3. Furthermore, in a fourth step, an individual degree of clogging is determined on the basis of the theoretical flow and the current flow. In this context, in particular the quotient between the current and the theoretical flow is determined.

Then, in a fifth step, the computing unit 5 calculates an interval within which a degree of clogging of the line system 5 lies with a probability to be defined on the basis of a number of determined individual degrees of clogging using stochastic methods. The stochastic methods can in particular include a one-sample t-test. The probability to be defined can be specified to the computing unit 5 by an operator. The probability is freely selectable. As a rule, the probability is set to at least 90%, preferably to at least 95%.

In a sixth and final step, the line system 1 is monitored by using the position of the calculated interval with respect to first limits for the degree of clogging that are defined beforehand. The position of the calculated interval serves as an indication of the presence of a fault in the line system 1. The same applies to the size of the calculated interval.

Steps 1 to 6 are performed at cyclic intervals time intervals, wherein the time intervals are between 2 seconds and 5 seconds, preferably 3 seconds.

If the calculated interval for the degree of clogging lies outside the defined first limits for the degree of clogging, an alarm apparatus 13 coupled to the computing unit 5 issues an alarm as an indication of the fault in the line system 1.

FIG. 1 shows the line system 1 as a cooling system of a continuous casting plant for the production of a metallic strand 6. Here, the liquid medium 3 guided by means of the line 2 to a nozzle 7 is applied by means of the nozzle 7 to the metallic strand 6, in particular to a steel strand. The monitoring of the line system 1 is also performed during a standstill of the continuous casting plant.

The mode of operation of the computing unit 5 is determined by a computer program 14 which runs in the computing unit 5. The computer program 14 is located on a computer-readable storage medium 15.

Figure 2:
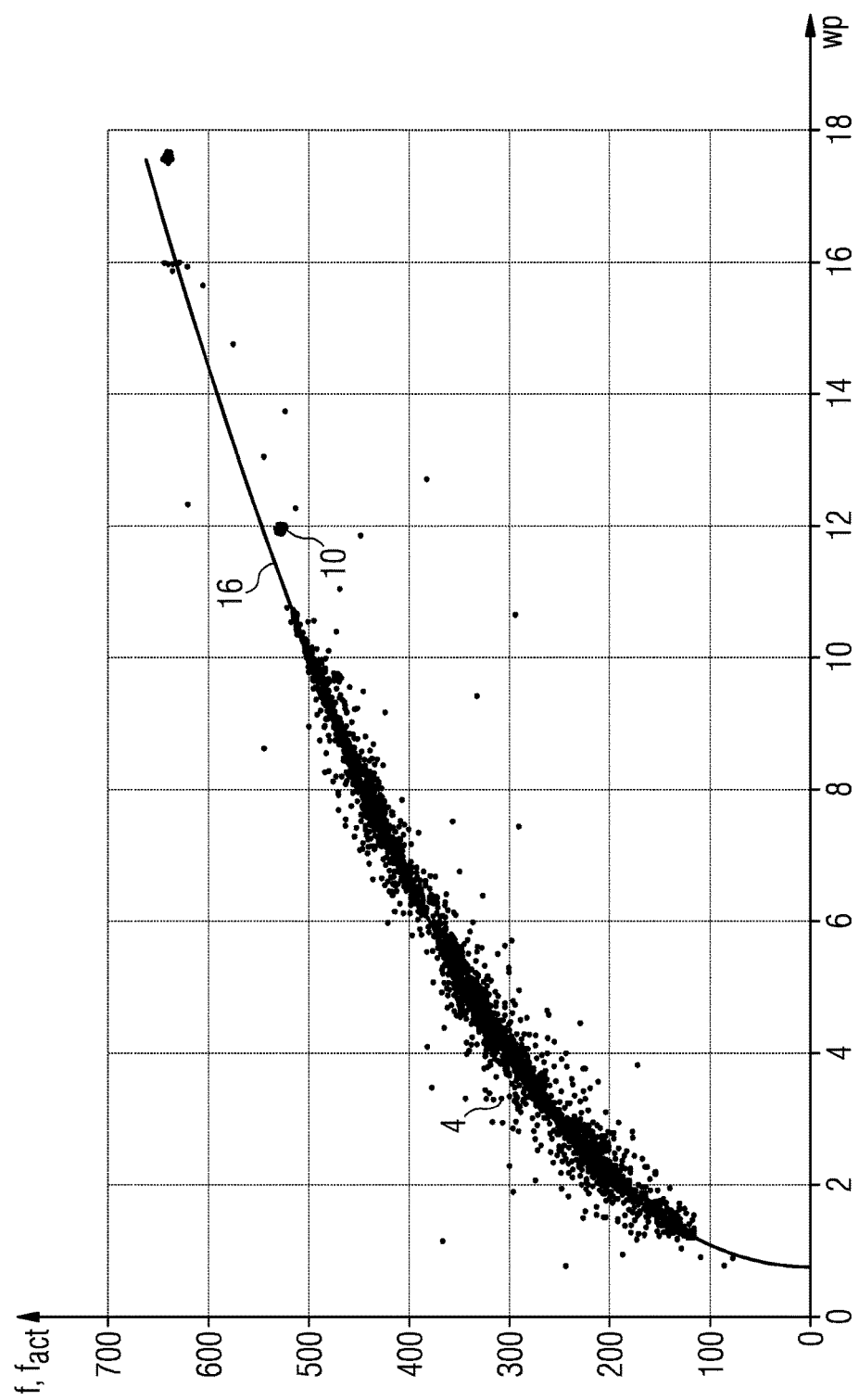

FIG. 2 shows a relationship between the current flow $f_{act}$ and the current pressure $w_p$ of the liquid medium 3 of the line system 1 and a data fit 16. The current pressure $w_p$ of the liquid medium 3, to be specific the water pressure, is plotted on the abscissa. The following are depicted on the ordinate in dependence on the current pressure $w_p$:

the current flow $f_{act}$ of the liquid medium 3, specifically the current water flow, which was determined in the line 2 of the actual line system 1—depicted by small dots 4, the current flow $f_{act}$ of the liquid medium 3, specifically the current water flow, which was determined in the line 2 of the line system 1 of a test arrangement in which the physical relationships of the actual line system 1 or the at least one line 2 are reflected-depicted by large dots 10 and the theoretical flow f of the liquid medium 3, specifically the theoretical water flow, which in FIG. 2 was determined as a data fit 16 of the values for the current flow $f_{act}$ of the liquid medium 3 in the line 2 of the actual line system 1. The data fit 16 could also be determined in the same way from the test arrangement. The theoretical flow f represents the flow function, i.e. the relationship between the current pressure $w_p$ of the liquid medium 3 and the current flow $f_{act}$ of the liquid medium 3. The flow function is stored in the computing unit 5.

The present invention has numerous advantages. In particular, it is possible to determine the degree of clogging in a highly precise and reliable manner.

Although the invention was illustrated and described in detail by the preferred exemplary embodiment, the invention is not restricted by the disclosed examples and other variations can be derived therefrom by the person skilled in the art without departing from the scope of protection of the invention.

LIST OF REFERENCE NUMBERS

1 Line system
2 Line
3 Liquid medium
4 Small dots
5 Computing unit
6 Metallic strand
7 Nozzle
8 Apparatus for determining the current pressure of the liquid medium
9 Apparatus for determining the current flow of the liquid medium
10 Large dots
11 Flow function
12 Monitoring unit
13 Alarm apparatus
14 Computer program
15 Computer-readable storage medium
16 Data fit

The invention claimed is:

1. A method for monitoring a line system, wherein a liquid medium is guided in at least one line of the line system; the method comprising:
   a) sensing the current pressure of the liquid medium in the at least one line and sensing the associated current flow of the liquid in the at least one line;
   b) receiving the sensed current pressure and the sensed current flow by a computing unit;
   c) calculating by the computing unit a respective theoretical flow of the liquid medium in the at least one line from the respective sensed current pressure including taking into account a prespecified flow function describing a physical relationship between the theoretical flow of the liquid medium and the respective current pressure of the liquid medium;
   d) determining by the computing unit a respective individual degree of clogging of the at least one line on the basis of the respective current and the respective theoretical flow;
   e) calculating by the computing unit an interval within which a degree of clogging of the line system lies with a probability to be defined on the basis of a number of determined individual degrees of clogging using stochastic methods for determining with a specific probability of error the values κ (κ models the degree of clogging) for which the data flows κ, theoretical flow and current flow f and $f_{act}$ cannot be generated by the same random process; and
   f) monitoring the line system by using the size of the calculated interval and/or the position of the calculated interval with respect to first limits for the degree of clogging that are defined beforehand as an indication of the presence of a fault in the line system.

2. The method as claimed in claim 1, further comprising the line system is embodied as a cooling system in a metallurgical unit, or in a continuous casting plant for the production of a metallic strand, or in a rolling mill for production of a metal strip; and
   guiding the liquid medium by the at least one line to a nozzle, applying the liquid medium by the nozzle to the metallic strand or to the metal strip.

3. The method as claimed in claim 2, wherein the liquid medium guided to the nozzle is water.

4. The method of claim 2, wherein the monitoring of the line system is performed during a standstill of the continuous casting plant or of the rolling mill.

5. The method as claimed in claim 1, wherein the sensing times have a uniform time interval between one another lying between 2 seconds and 5 seconds.

6. The method as claimed in claim 1, wherein the stochastic methods include a one-sample t-test.

7. The method as claimed in claim 1, further comprising specifying the probability to be defined to the computing unit by an operator.

8. The method as claimed in claim 1, further comprising issuing by the computing unit an indication of a fault in the line system when the calculated interval for the degree of clogging lies completely outside the defined limits for the degree of clogging.

9. The method as claimed in claim 1, further comprising issuing by the computing unit an alarm indicating that the line system is indeterminable when the calculated interval is greater than a predetermined second limit.

10. A computer program product comprising:
a non-transitory computer-readable storage medium; and
a computer program product comprising a machine code and stored on the storage medium, and the code can be executed by a computing unit, wherein the execution of the machine code by the computing unit causes the computing unit to carry out a method with steps b) to e) in claim 1.

11. A computing unit having a computer program product programmed with a computer program as claimed in claim 10.

12. A device, for monitoring a line system, comprising:
a) a line system having at least one line in which a liquid medium can be guided; and
b) at least one apparatus for determining the current pressure of the liquid medium in the at least one line and the current flow of the liquid medium in the at least one line and a computer program product of claim 10, coupled to the apparatus.

13. The device as claimed in claim 12, further comprising a monitoring unit for monitoring the line system by using the size of the calculated interval and/or the position of the calculated interval with respect to first limits for the degree of clogging that are defined beforehand as an indication of the presence of a fault in the line system.

14. A computer program product comprising:
a non-transitory computer-readable storage medium; and
a computer program product comprising a machine code and stored on the storage medium, and the code can be executed by a computing unit, wherein the execution of the machine code by the computing unit causes the computing unit to carry out a method with steps b) to f) in claim 1.

* * * * *